June 17, 1969
G. D. BECKER ET AL
3,450,211
ADJUSTABLE SET AND FLOTATIONAL SUPPORT FOR
A TRACTOR-MOUNTED IMPLEMENT
Filed March 30, 1967
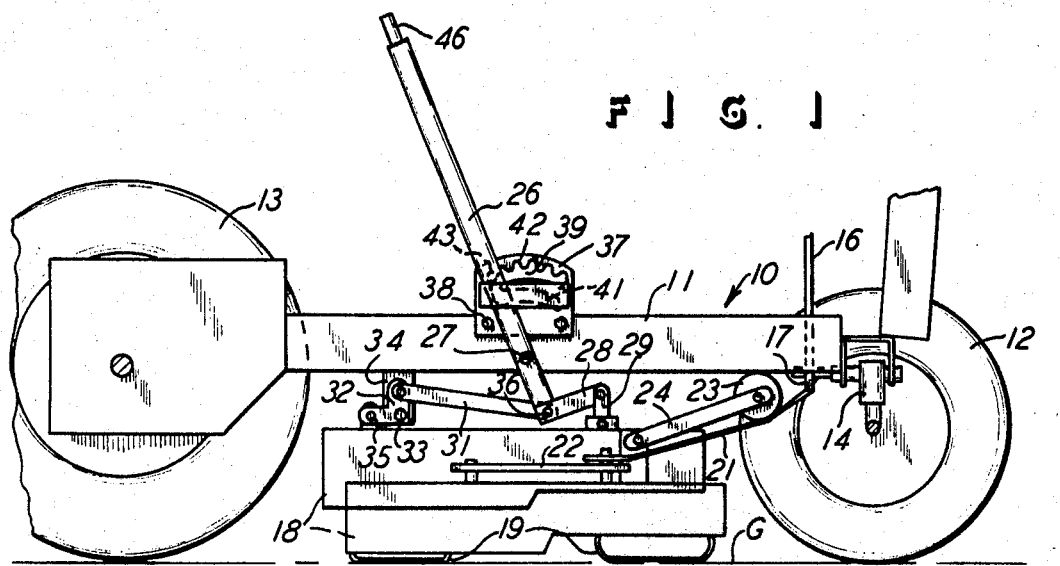
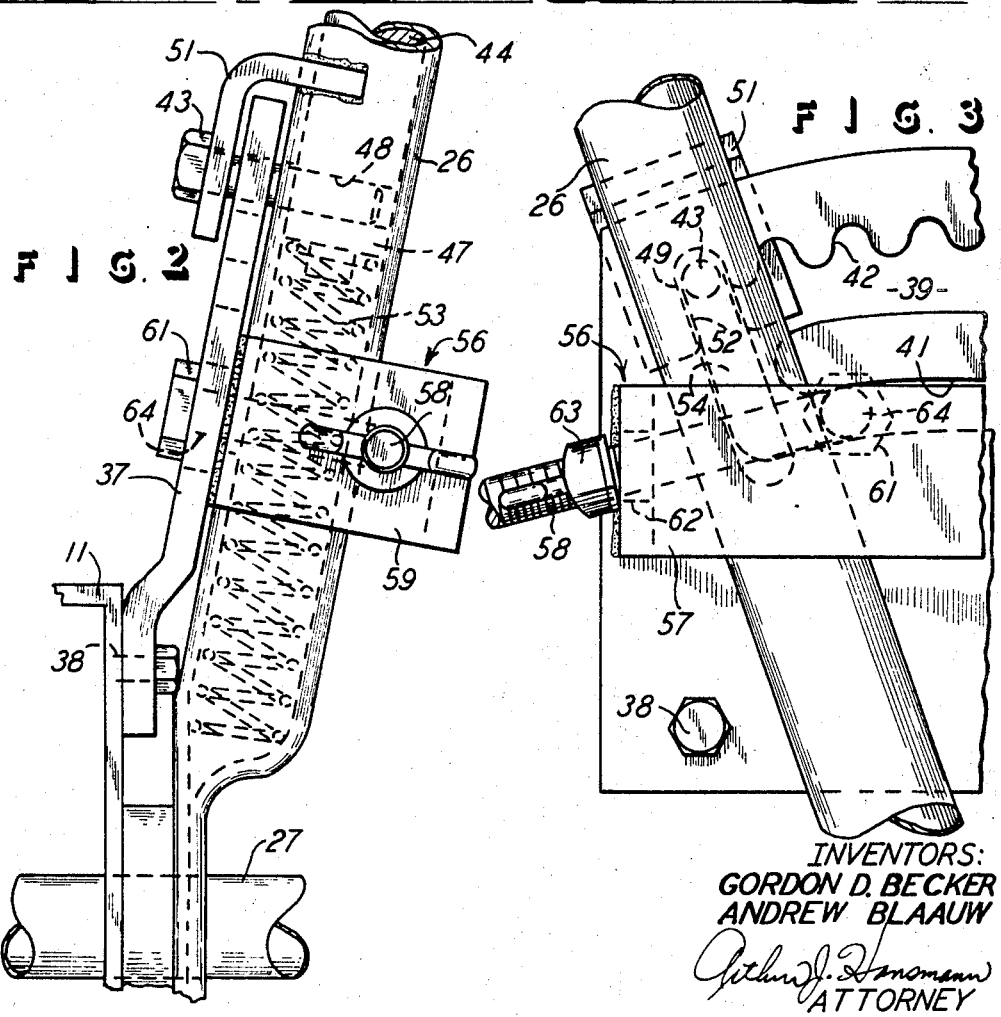
INVENTORS:
GORDON D. BECKER
ANDREW BLAAUW
ATTORNEY

United States Patent Office 3,450,211
Patented June 17, 1969

3,450,211
ADJUSTABLE SET AND FLOTATIONAL SUPPORT FOR A TRACTOR-MOUNTED IMPLEMENT
Gordon D. Becker, Larsen, and Andrew Blaauw, Winneconne, Wis., assignors to Colt Manufacturing Company, Inc., Winneconne, Wis., a corporation of Wisconsin
Filed Mar. 30, 1967, Ser. No. 627,043
Int. Cl. A01d 35/26
U.S. Cl. 172—483          6 Claims

ABSTRACT OF THE DISCLOSURE

A garden-type tractor having an implement vertically adjustably mounted thereon. Lever means connect the implement to the tractor for the vertical adjustment, and index means connects between the tractor and the lever for selective setting of the lever in either a fixed pivoted position or in a freely pivotal condition. The implement is, therefore, maintained in either a selected vertically adjustable position with respect to the tractor, or it is free to float vertically with respect to the tractor.

Background of the invention

The prior art is aware of the combination of implements being vertically adjustably mounted on garden-type tractors. The means for the adjustable mounting are usually a type of index means which interconnects the tractor and the implement, and a pivotal lever is also used for the interconnection. Thus movement of the lever will induce a desired vertical movement of the implement, and the index means permits the lever to be pivotally movable and set in a selected position so that the implement is set in selected vertically adjusted positions with respect to the tractor, as desired.

The aforementioned prior art structures do not provide a combined means for effecting the vertically set positions and also effecting the function of permitting the implement to float or be relatively movable with respect to the tractor during the operation of the implement. Thus, the prior art fails to provide an answer for the requirement and problem of permitting the operator to either set the implement in an adjusted but fixed position with respect to the tractor, or to set the implement in a condition where it will be free to float vertically.

More specifically, in the arrangement of a lawn mower on a garden-type tractor, it is desired to have the mower set in an adjusted but fixed position with respect to the tractor on certain mowing conditions. However, at other times of mowing, it is desirable to have the mower free to float or move vertically with respect to the tractor. Further, it is important to have the implement-mounted structure, including the lever and the index means, subject to a limit control or restrictor which will permit adjustable setting of the end limits of movement of the lever in both the set position and the floating position of the lever. Also, the mounting structure of this invention permits the adjustable setting and flotational setting of the numerous implements generally mounted on a garden-type tractor, such as lawn mowers, snow plows, rotary brooms, agricultural implements, and the like.

This invention improves upon the prior art, as mentioned above, and it does so in an installation wherein the tractor and the implement may also be related so that the working parts of the implement are driven off the power of the tractor, though the implement may nevertheless be set and vertically movable with respect to the tractor and while it is operating.

Brief description of the drawings

FIG. 1 is a side elevational view of certain structure of this invention, and showing it with a fragment of a tractor and with a lawn mower in two different positions.

FIG. 2 is an enlarged end elevational view of the structure of FIG. 1, fragmentarily shown, with parts added thereto.

FIG. 3 is a side elevational view of a portion of FIG. 2.

Description of the preferred embodiment

A tractor, generally designated 10, is shown to include a frame 11, front wheel 12, rear wheel 13, and a front axle 14 extending between the frame 11 and the front wheel 12. Also, a drive belt 16 is fragmentarily shown and extends to a pulley 17 which is suitably rotatably supported on the tractor 10. The tractor engine (not shown) would provide the drive for the belt 16 to rotate the pulley 17 which in turn drives the implements mounted on the tractor 10.

The particular implement shown in FIG. 1 is a rotary lawn mower 18, and it is shown in a lowered position and in a raised position. Further, the implement is shown to have skids 19 which may ride upon the ground designated by the line G. Thus, when the implement is adjusted on the tractor 10 so that it will extend down to the ground line G, the skids may then support the implement, such as the lawn mower 18, on the ground. Further, drive means are shown extending from the tractor pulley 17 to the lawn mower 18. Such means is shown to include a belt 21 which extends from the pulley 17 to drivingly connect to a belt 22 on the mower 18. Thus, power from the tractor 10 is brought to the mower 18 for driving the cutter bar (not shown) of the mower 18. Also, a guide pulley 23 is shown pivotally mounted on the mower 18 by means of a pivot arm 24. Therefore, when the mower 18 is raised and lowered, the belt 21 will be properly guided so that it will constantly drive the mower 18, as desired.

The mower 18 is supported on the tractor 10 by suitable means. Lever 26 is pivoted on the tractor frame 11 at a trunnion 27 affixed to the side of the frame 11. Thus the lever 26 can move forwardly and rearwardly with respect to the fore-and-aft direction of the tractor 10, and such movement is about the pivot shaft 27. The lever 26 is suitably pivotally connected to the mower 18 to raise and lower the mower 18 in accordance with the pivoted position of the lever 26. Thus a fixed arm 28 extends forwardly from the lower end of the lever 26, and it pivotally connects to a link 29 pivotally mounted on a mower 18. Also, a link 31 is pivotally connected to the lower end of the lever 26 and it also pivotally connects to a bell crank 32 which is pivotally mounted on the mower through a pivot shaft 33 supported on the mower by a bracket 34 affixed to the frame 10. The bell crank 32 is also pivotally connected to the mower 18 through the pivot shaft 35. It will therefore be understood that a common structure for adjustably supporting the mower 18 on the lever arm 26 is suitable. In the structure mentioned, it will be understood that movement of the lower end of the lever 26, that is its pin 36, rearwardly on the tractor will cause the mower 18 to move from the shown raised position to the shown lowered position where the skids 19 are riding on the ground.

A plate 37 is fixed to the tractor frame 10 by means of bolts 38. The plate provides index means for the vertical positioning of the implement 18 in that it has an opening 39 and an opening 41, with both openings being in the form of elongated slots. Further, the upper edge of the opening 39 is defined by a row of teeth 42, and these teeth receive a pin 43 which is disposed radially of the cylindrical lever 26 but which is axially adjustable with respect to the lever 26. Thus, a control member 44 extends from an end 46 above the lever 26 to an end 47 within the lever 26. An opening 48 in the lower end 47 receives the pin 43, which is shown to be in the form of a screw in FIG. 2. The control 44 is axially slidable in the lever 26, and it, therefore, moves the pin 43 along the lever 26 so that the indexing adjustment can be made along the row of teeth 42. Thus the lever 26 has a slot 49 to permit movement of the pin 43. Also, a bracket 51 is secured to the lever 26 and has a slot 52 extending in a position to receive the pin 43 and thereby further guide and support the pin 43, with respect to the lever 26.

A return spring 53 is disposed in the lower end of the lever 26 and it abuts the lower end of the control 44 to yieldingly urge the control upwardly so that the pin 43 is normally engaged with the teeth 42. Of course the operator need only depress the control upper end 46 to release the pin 43 from the teeth 42 and permit pivotal movement on the lever 26 as the pin 43 is then free to move along the slot 39. The operator can therefore set the vertical position of the implement 18 with respect to the tractor 10 in accordance with the pivotal position of the lever 26 and its releasable locked relation with the index means described. Thus the index means has disengageable locking members, such as the teeth 42 and the pin 43.

When it is desired to place the implement, such as the mower 18, in the free-floating position, then the control 44 may be depressed until the pin 43 enters the slot 41 through the passageway 54 in the plate 37. In that position, the lever 26 is free to pivot as the pin 43 slides back and forth in the slot 41. The slot 41 and the row of teeth 42 are shown to be disposed in parallel relationship and on an arc centered about the axis of the pivot shaft 27.

A restrictor or limit control means is provided, and is generally designated 56. Thus a bracket 57 is secured to the plate 37 to extend mainly spaced therefrom and provide space for the pivotal movement of the lever 26. An L-shaped bar 58 extends through the side wall 59 of the bracket 57, and it extends through the slot 41 and terminates in a flat head 61 on the rear of the plate 37. Thus the rod 58 extends through the opening 62 in the bracket 57 and is slidable therein. A wing nut 63 is adjustable along the rod 58 to shorten and lengthen the extent of the rod 58 to slot 41. The rod end 64 is in the path of the lever 26 to restrict the degree of pivot of the lever 26. The rod 58 is long enough to have its end 64 in the far end of the slot 41 while the wing nut 63 is still on the rod 58. So, the rod 58 is available for adjustably controlling the pivot of the never 26 when the pin 43 is in either one of the slots 39 and 41. The operator can therefore govern the lowered position of the mower 18, both when it is to be adjustably set and when it is to be floating.

What is claimed is:

1. A selective set and flotational support for adjustably vertically supporting an implement on a tractor, a tractor, an implement, a lever pivotally mounted on said tractor and vertically pivotally conecting said implement to said tractor, index means operatively connecting said lever to said tractor and including disengageable interlocking members and a control member for setting said interlocking members in elected indexed positions for the selective setting of the pivot position of said lever on said tractor and thus for the adjustable elevation of said implement on said tractor, the improvement comprising a lockout structure operatively connected with said interlocking members for releasably securing said interlocking members in a disengaged position for floating support of said implement on said tractor in addition to said adjustable elevation of said implement on said tractor, said lockout structure including a track, and said interlocking members including a pin guidable on said track for securing said interlocking members disengaged, and said control member being operatively connected to said pin for selectively setting said pin on said track.

2. The subject matter of claim 1, wherein said index means includes a toothed rack with a row of teeth affixed to said tractor, and said track extends parallel to said row of teeth for the holding of said pin out of interlocking relation with said teeth for the floating movement of said implement on said tractor.

3. The subject matter of claim 2, wherein said row of teeth and said track are arcuately disposed concentric with the axis of pivot of said lever.

4. The subject matter of claim 2, including an adjustable limit control disposed on said track and operatively connected to said lever for adjustably governing the degree of pivot of said lever on said tractor.

5. The subject matter of claim 1, wherein said index means includes a plate affixed to said tractor and having a row of teeth, and said pin being movable on said lever and engageable with said teeth on said plate for the securing said lever and thus said implement in the selected pivoted positions on said tractor, and said track is a slot in said plate and said slot extends parallel to said row of teeth for receiving said pin and holding the latter out of interlocking relation with said teeth for the floating movement of said implement on said tractor.

6. The subject matter of claim 5, including an adjustable limit control disposed in said slot and operatively connected to said lever for adjustably governing the degree of pivot of said lever on said tractor.

References Cited

UNITED STATES PATENTS 624,729   5/1899   Beall _____ 74—538
1,338,195 4/1920   Santler _____ 172—483 X ANTONIO F. GUIDA, *Primary Examiner.*
STEPHEN C. PELLEGRINO, *Assistant Examiner.*

U.S. Cl. X.R.

56—25.4; 74—538